Oct. 11, 1938.    C. J. BARRY    2,133,010
HANDLE BAR
Filed May 1, 1937
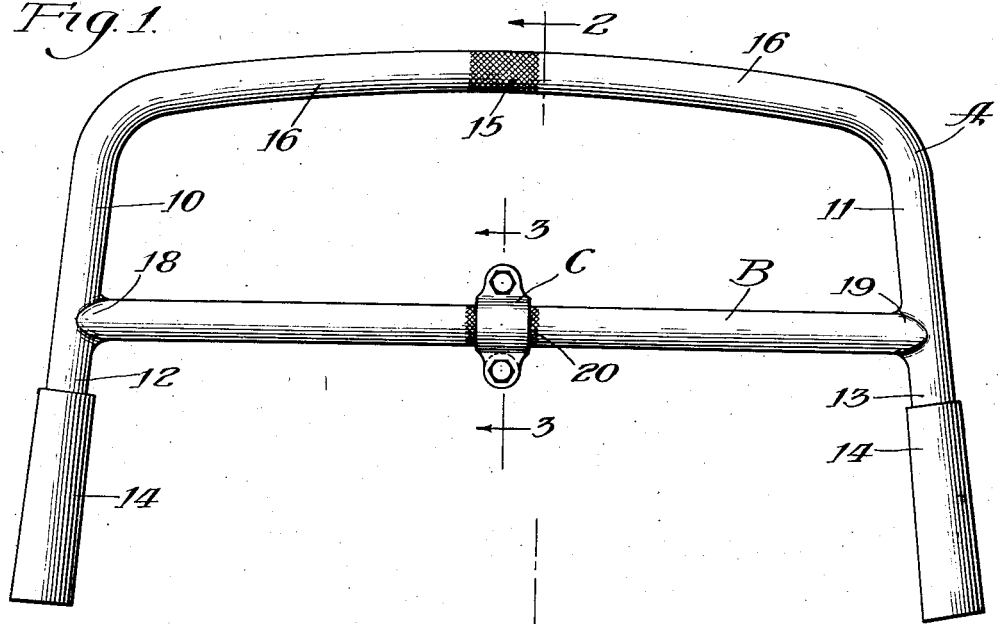
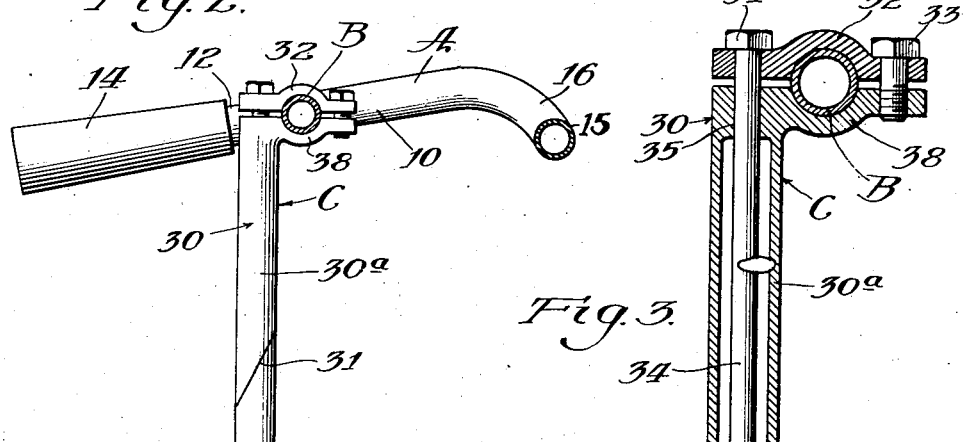
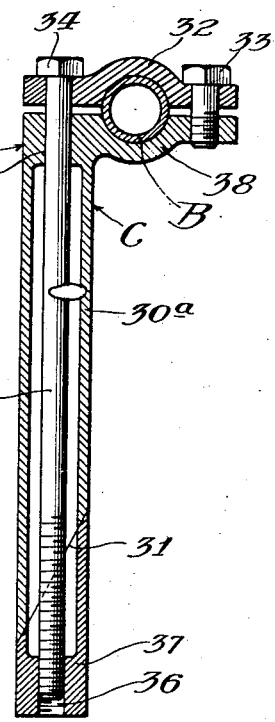
Inventor:
Cornelius J. Barry,
By Stritter, Wiles, Davis, Hiscock & Dawson
Attorneys.

Patented Oct. 11, 1938

2,133,010

UNITED STATES PATENT OFFICE 2,133,010

HANDLE BAR

Cornelius J. Barry, Chicago, Ill., assignor to Superior Plating Works, a corporation of Illinois Application May 1, 1937, Serial No. 140,245

2 Claims. (Cl. 74—551.1)

This invention relates to a handle bar structure for use in connection with bicycles, motorcycles and the like.

An object of the invention is to provide a structure in which the handle bars are held more securely and in which tilting of the bars while in use is prevented.

Another object is to provide a structure which is more adjustable to suit the convenience of the rider and which allows the handles to be placed in forward or rearward position and raised or lowered. It is also desired that the handle bars be securable in inverted position when the rider chooses.

Still another object is to provide improved connecting means for securing the handle bar within the steering shank of the bicycle or motorcycle and wherein the connecting piece may be made fast with both handle bar and steering shank in a single operation. Other specific objects will appear as the specification proceeds.

An embodiment of the invention is illustrated in the accompanying drawing in which—

Fig. 1 is a plan view of the improved handle bar structure, the connecting means being shown fastened about the brace bar; Fig. 2, a sectional view in elevation, the section being taken as indicated at line 2—2 of Fig. 1; and Fig. 3, a sectional view in elevation of the improved connecting means, the section being taken as indicated at line 3—3 of Fig. 1.

As illustrated, A designates a substantially U-shaped bar; B, a transverse brace bar; and C, the means by which the handle bar is secured with the steering shank of the bicycle or motorcycle.

The bar A may be formed of metallic tubing and is substantially U-shaped. It comprises the two rearwardly extending leg portions 10 and 11, providing the handles 12 and 13 which the rider may grasp in steering the bicycle. Rubber grips 14 may be received over the handles 12 and 13, if desired, to make the handles easier to hold.

The front or transverse part 16 of bar A is of curved outline, and as shown more clearly in Fig. 2, has a central portion 15 which lies in a plane below the plane of leg portions 10 and 11. Portions 10 and 11, it may be noted, extend rearwardly substantially in a single plane. Preferably, sharp curves are avoided and part 16 is curved upwardly and rearwardly from central portion 15 to join with leg portions 10 and 11 in wide curves. The specific outline of the bar, however, is a matter of choice.

The transverse bar B may also be of metallic tubing of the same type as used in the construction of bar A. Bar B is simply a straight length of tubing which has its ends 18 and 19 welded or otherwise fixedly secured to leg portions 10 and 11. The central portion of bar B is preferably knurled as indicated at 20 in Fig. 1. This knurled area serves to prevent turning of the bar within the connecting means and also marks the center of the bar so that anyone attaching the bar will easily see where the connection should be made. The central portion 15 of bar A is also knurled and for the same purpose as just stated. Preferably the bars A and B should be of the same diameter, but it is important that the knurled portions 15 and 20 be of substantially the same outside diameter, for these portions are to be engaged by the same connecting means.

The connecting means C comprises a connecting piece 30, the upper portion of which forms the lower jaw 38 of a clamp. The shank portion 30ª of piece 30 is tubular and has its bottom beveled as indicated at 31. A top piece 32 forms the upper jaw of the clamp, and a bolt 33 is provided for securing the one end of this jaw to piece 30. The other end of jaw piece 32 is secured by a bolt 34 extending through the end of this piece, through opening 35 in connecting piece 30, downwardly through the hollow of shank 30ª, and at its lower end engaging a tapped hole 36 in cylindrical piece 37 which is beveled at its top to complement bevel 31 of the piece 30.

To attach the improved structure to the steering shank of a bicycle or motorcycle, the center knurled portion of brace bar B is placed between the jaws 38 and 32 of the clamping means and bolts 33 and 34 inserted. Then the shank 30ª of the connecting means is inserted into the hollow of the steering shank. When the handle bar is properly positioned as to height and inclination, bolts 33 and 34 are tightened. Tightening of bolt 34 not only serves to clamp the bar B tight to piece 30, but also serves to clamp this piece secure in the steering shank. As bolt 34 is tightened the lower cylindrical piece 37 will slide along beveled edge 31 and move laterally to expand the device against the walls of the shank. At the same time, the action of bolt 34 serves to pull the jaws of the clamp together for binding the handle bar tightly with the connecting piece.

In the improved structure the connecting means may be attached either to bar B as above described and as illustrated in Figs. 1 and 2, or may be attached to the forward center portion 15 of bar A. The attachment with portion 15 is made in just the same way as described in connection with knurled portion 20 of bar B. If the rider wishes to change the attachment from bar B to bar A, he need only loosen bolt 34 and remove bolt 33 to allow bar B to be removed from the clamping means and bar A inserted. Tightening of the bolts then serves to secure the handle bar within the clamping means and to the steering shank. By changing the attachment of the connecting means from bar B to bar A the handles 12 and 13 are moved rearwardly, and since portion 15 lies in a plane lower than bar B, are also moved to a higher position.

If the rider so chooses, he may detach the connecting means from bar B, invert the handle bar, and again attach the connecting means with the knurled portion 20 of bar B with the handle bar in inverted position. In this position the forward portion 16 of the U-shaped bar, which formerly was curved downwardly, is now curved upwardly and provides a convenient seat for a second rider, the upturned portion serving to keep the rider sitting on the handle bar from sliding off forwardly.

An important advantage is gained in being able to attach the connecting means to the brace bar B, for there is much less danger of the handle bar being turned or twisted within the clamping means when attachment is made on brace bar B. The strength of the combined U-shaped bar and brace bar is retained while the tendency to move the handle bar about a pivot is greatly reduced. It is common for riders to pull or push rather vigorously against the handles or the handle bar, and this frequently breaks the fixed connection to allow the bars to turn within the clamping means. But in this improved structure, with the steering shank connected to the brace bar, the leverage is greatly reduced and the pressure exerted on the handles is much less likely to cause turning of the brace bar within the clamping means.

Because the handle bar may be connected either through attachment at bar A or bar B, a bicycle may be easily adjusted to accommodate riders of different sizes. When the attachment is made to bar A, the handles will be farther toward the rear and closer to the rider, and this position may be found more suitable to smaller sized persons. It is always possible to adjust the handle bar to the desired angle, and the expansive means for making attachment to the steering shank is very convenient in adjusting the height of the whole handle bar structure.

The foregoing detailed description has been given for clearness of understanding only, and no unnecessary limitations should be understood therefrom, but the appended claims should be construed as broadly as permissible in view of the prior art.

I claim:

1. In combination with the steering post of a bicycle, a handle bar structure comprising a cross bar having its central portion removably clamped to said steering post, and handle members secured to the ends of said cross bar and extending rearwardly and forwardly thereof, the forward portions of said handle bar being connected by an integral bend portion and substantially straight portion, said straight portion being substantially parallel with and horizontally aligned with said cross bar.

2. In combination with the steering post of a bicycle and a handle bar clamping means thereon, a cross bar having its central portion releasably secured by said clamping means to said post, and a pair of spaced handle bars secured at intermediate portions to the ends of said cross bar and having portions projecting forwardly of said cross bar, said forwardly projecting portions being joined by an integral cross member which is substantially horizontally aligned with said cross bar and parallel therewith.

CORNELIUS J. BARRY.